June 17, 1930.                    T. H. MILLS                    1,764,221
                                    TONGS
                              Filed Dec. 12, 1927
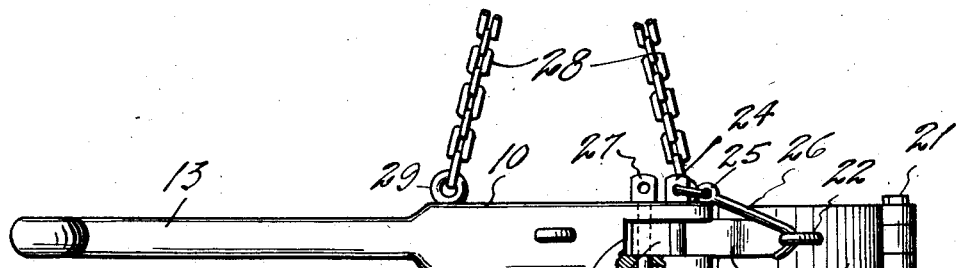
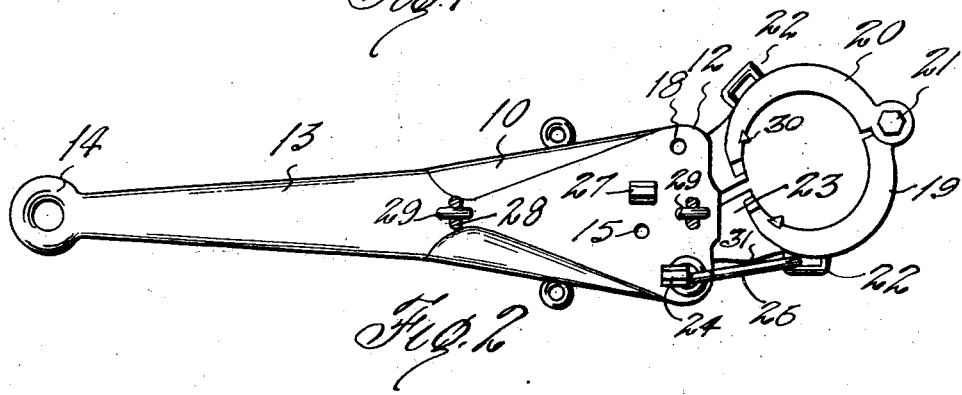
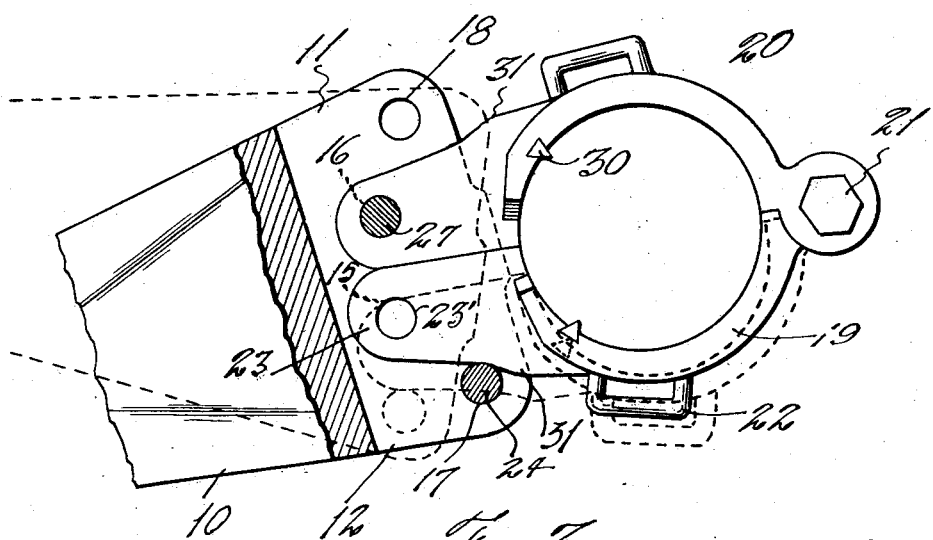

Patented June 17, 1930

1,764,221

UNITED STATES PATENT OFFICE

THEODORE H. MILLS, OF FRESNO, CALIFORNIA, ASSIGNOR OF ONE-HALF TO THE GUIBERSON CORPORATION, OF DALLAS, TEXAS, A CORPORATION OF DELAWARE

TONGS

Application filed December 12, 1927. Serial No. 239,294.

This invention relates to new and useful improvements in tongs.

One object of the invention is to provide a tongs which, when once engaged with the work, may be readily reversed by a simple change in parts and without disengaging the jaws from the work or swinging the same from the supporting yoke.

Another object of the invention is to provide a tongs having a pair of work engaging jaws, one of which is retained in such a manner as to have a limited movement for freeing itself from the work without disengaging therefrom.

Another object of the invention is to provide a tongs which may be suspended in a balanced position so as to be easily and readily manipulated.

A construction designed to carry out the invention will be hereinafter described, together with other features of the invention.

The invention will be more readily understood from a reading of the following specification and by reference to the accompanying drawings, in which an example of the invention is shown and wherein:

Fig. 1 is a side elevation of a tongs constructed in accordance with the invention, Fig. 2 is a plan view of the same, and Fig. 3 is an enlarged detail.

In the drawings the numeral 10 designates a head which is provided with a transverse slot 11 at its forward end to form a yoke 12. The head is flared in the general direction of the yoke and is made integral with a reduced handle 13 having an eye 14 at its rear end.

On each side of the longitudinal axis of the head and yoke I provide apertures or holes 15 and 16 respectively. At each outer corner of the yoke I provide holes 17 and 18 respectively. A pair of substantially semi-circular jaws 19 and 20 respectively have their outer ends hinged together by a bolt 21. Each jaw has a central outwardly directed loop 22 on its outer face and is provided with a reduced arm 23 extending inwardly in the slot 11 of the yoke.

A headed pin 24 is provided for engaging in either of the holes 17 or 18. The pin has a ring 25 pivoted in its head and carrying a hook 26 of sufficient length to engage in the adjacent loops 22. A headed pivot pin 27 is provided for fitting in either of the holes 15 or 16 and passing through a hole 23' with which each arm 23 is provided.

In using the tongs it is suspended by chains 28 which are engaged with a pair of eyes 29 on the longitudinal center of the head 10 and at the front and rear ends thereof, whereby said tongs is balanced and may be freely moved with relation to the work. I have shown the pin 27 engaged in the apertures 16 and 23' whereby the jaw 20 is pivoted by means of its arm 23 on the left hand side of the head 10.

The jaw 19 is thus left free to be swung around the work and its arm 23 pushed into the slot 11 of the yoke 12. The pin 24 is engaged in the apertures 17 whereby the arm of the jaw 19 is confined in said yoke. The hook 26 is engaged in the loop 22 of the jaw 19, whereby said jaw is confined to a limited movement. Each jaw is provided with a tooth 30 for engaging the work.

It will be seen that when the handle 13 is swung to the left, as is illustrated in Fig. 2, the jaws will be freed from the work. It will be noted that each arm 23 is formed with an outwardly curved boss 31 and when the handle is swung to the right, the pin 24 (Fig. 3) will ride along the boss 31 and crowd the arm 23 of the jaw 19 toward the arm 23 of the jaw 20, whereby the jaws will be brought together and the teeth 30 caused to grip the work. During the swinging movement of the handle the pin 27 acts as a pivot.

It will be seen that the operation is very simple and the movement of the handle quickly causes the jaws to take hold and when reversed as quickly causes them to release. It is obvious that by disengaging the hook 26 from the loop 22 and swinging the jaws to the left, the arm 23 of the jaw 19 may be pulled from the slot 11 and said jaw opened without removing the pin 24. When it is desired to reverse the operation of the tongs, the pin 24 is engaged in the holes 18 and the pin 27 is engaged in the holes 15 and the aperture 23' of the arm of the yoke 19.

Various changes in the size and shape of the different parts, as well as modifications and alterations, may be made within the scope of the appended claims.

What I claim, is:

1. In a tongs, a head having a yoke formed with a pair of pivoting holes in parallel planes and a second pair of holes, one at each side of the pivoting holes and adjacent the edge of said yoke, gripping jaws connected at the outer ends by a fixed pivot and formed at their inner ends with outer bearing faces and pivoting holes, a pivot engageable with either pivot hole of the yoke and the pivot hole of one jaw, a closure pin disposed in one of the second pair of holes to engage the outer bearing face of the jaw which is not pivoted to the yoke and means connecting said closure pin with the jaw engaged thereby.

2. In a tongs, a head having a yoke formed with a pair of pivoting holes in parallel planes and a second pair of holes, one at each side of the pivoting holes and adjacent the edge of said yoke, gripping jaws connected at the outer ends by a fixed pivot and formed at their inner ends with outer bearing faces and pivoting holes, a pivot engageable with either pivot hole of the yoke and the pivot hole of one jaw, a closure pin disposed in one of the second pair of holes to engage the outer bearing face of the jaw, a loop upon the outer face of each jaw, and a hook carried by the closure pin to engage one loop.

In testimony whereof I affix my signature.

THEODORE H. MILLS.